US012795761B2

(12) United States Patent
Onaka et al.

(10) Patent No.: US 12,795,761 B2
(45) Date of Patent: Nov. 10, 2026

(54) COMMUNICATION SYSTEM, BASE STATION AND USER EQUIPMENT INCLUDING TRANSMITTING INFORMATION ON FRAME TIMING OF THE BASE STATION

(71) Applicant: Mitsubishi Electric Corporation, Chiyoda-ku (JP)

(72) Inventors: Yasuhiro Onaka, Tokyo (JP); Tadahiro Shimoda, Tokyo (JP); Mitsuru Mochizuki, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 257 days.

(21) Appl. No.: 18/468,146

(22) Filed: Sep. 15, 2023

(65) Prior Publication Data

US 2024/0008120 A1 Jan. 4, 2024

Related U.S. Application Data

(63) Continuation of application No. 17/056,313, filed as application No. PCT/JP2019/029054 on Jul. 24, 2019, now abandoned.

(30) Foreign Application Priority Data

Jul. 27, 2018 (JP) ................................ 2018-141113

(51) Int. Cl.
*H04W 76/15* (2018.01)
*H04W 72/0453* (2023.01)
*H04W 92/20* (2009.01)

(52) U.S. Cl.
CPC ....... *H04W 76/15* (2018.02); *H04W 72/0453* (2013.01); *H04W 92/20* (2013.01)

(58) Field of Classification Search
CPC . H04W 76/15; H04W 72/0453; H04W 92/20; H04W 76/16; H04W 72/1215;
(Continued)

(56) References Cited

U.S. PATENT DOCUMENTS

2015/0326371 A1* 11/2015 Baek ......................... H04L 5/00 455/450
2019/0109663 A1 4/2019 Kusano
(Continued)

FOREIGN PATENT DOCUMENTS

EP 4106368 A1 * 12/2022 .............. H04W 4/90
WO 2017/208408 A1 12/2017
(Continued)

OTHER PUBLICATIONS

Patent Office of India, Hearing Notice, Application No. 202047050904, dated Jul. 5, 2024, in 2 pages.
(Continued)

*Primary Examiner* — Thai Nguyen
(74) *Attorney, Agent, or Firm* — PROCOPIO, CORY, HARGREAVES & SAVITCH LLP

(57) ABSTRACT

Provided is a technology that can maintain the reliability and the transmission rate in the communication. A communication system includes a communication terminal, and a first base station and a second base station that are configured to perform radio communication with the communication terminal. The first base station notifies the second base station of information on a numerology to be used for communication between the first base station and the communication terminal when the first base station and the second base station provide the communication terminal with dual connectivity using a same frequency band (Steps ST1501 and ST1502).

7 Claims, 19 Drawing Sheets

(58) Field of Classification Search
CPC . H04W 16/14; H04W 72/0457; H04W 28/18; H04W 72/04; H04L 5/001; H04L 5/0023; H04L 5/0053
See application file for complete search history.

(56) References Cited

U.S. PATENT DOCUMENTS

2019/0349906 A1* 11/2019 Futaki .................. H04L 5/0091
2019/0356460 A1* 11/2019 Tsuboi .................. H04W 72/04

FOREIGN PATENT DOCUMENTS

WO WO 2018/029952 A1 2/2018
WO WO 2018/127833 A1 7/2018
WO WO 2019/063694 A1 4/2019

OTHER PUBLICATIONS

State Intellectual Property Office of the People's Republic of China, Chinese Office Action, Application No. CN20198048911.2, dated Nov. 3, 2023, in 17 pages.
Japanese Patent Office, Office Action, Application No. 2023-128942, dated Jul. 16, 2024, in 6 pages.
Patent Office of India, Hearing Notice, Application No. 2020047050904, dated Jul. 5, 2024, in 2 pages.
State Intellectual Property Office of the People's Republic of China, Chinese Office Action, Application No. CN201980048911.2, dated Nov. 3, 2023, in 17 pages.
Japanese Office Action issued Apr. 18, 2023, in Japanese Patent Application No. 2020-532444, therein, 7 pages (with Computer Generated English Translation).
Extended European Search Report issued Jun. 28, 2022, in corresponding European Patent Application No. 19841856.8, 15 pages.
Office Action issued Nov. 11, 2022, in corresponding Indian Patent Application No. 202047050904 (with English Translation), 6 pages.
International Search Report issued on Oct. 8, 2019 in PCT/JP2019/029054 filed on Jul. 24, 2019, 3 pages.
3GPP TS 36.300, V14.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14), 2017, pp. 1-331.
"LS on HNB/HeNB Open Access Mode", 3GPP TSG-SA1 #42, S1-083461, Seoul, South Korea, Oct. 13-17, 2008, 2 total pages.
3GPP TR 36.814, V9.2.0, 3rd Generation Partnership Project; Technical Specification Group Radio Access Network; Evolved Universal Terrestrial Radio Access (E-UTRA); Further advancements for E-UTRA physical layer aspects (Release 9), 2017, pp. 1-105.
3GPP TR 36.912, V14.0.0, 3rd Generation Partnership Project; technical Specification Group Radio Access Network; Feasibility study for Further Advancements for E-UTRA (LTE-Advanced) (Release 14), 2017, 252 total pages.
Popovski et al., "Scenarios, requirements and KPIs for 5G mobile and wireless system", ICT-317669-METIS/D1.1, Metis, 2013, pp. 1-75 (83 total pages).
3GPP TR 23.799, V14.0.0, 3rd Generation Partnership Project; Technical Specification Group Services and System Aspects; Study on Architecture for Next Generation System (Release 14), 2016, pp. 1-522.
3GPP TR 38.801, V14.0.0, 3rd Generation Partnership Project; Technical Specification Group Radio Access Network; Study on new radio access technology: Radio access architecture and interfaces (Release 14), 2017, pp. 1-91.
3GPP TR 38.802, V14.1.0, 3rd Generation Partnership Project; Technical Specification Group Radio Access Network; Study on New Radio Access Technology Physical Layer Aspects (Release 14), 2017, pp. 1-144.
3GPP TR 38.804, V14.0.0, 3rd Generation Partnership Project; Technical Specification Group Radio Access Network; Study on New Radio Access Technology; Radio Interface Protocol Aspects (Release 14), 2017, pp. 1-57.
3GPP TR 38.912, V14.0.0, 3rd Generation Partnership Project; Technical Specification Group Radio Access Network; Study on New Radio (NR) access technology (Release 14), 2017, pp. 1-74.
NTT Docomo, Inc., "Revised WID on New Radio (NR) Access Technology", 3GPP TSG RAN Meeting #77, RP-172115, Sapporo, Japan, Sep. 11-14, 2017, 47 total pages.
3GPP TS 37.340, V15.0.0, 3rd Generation Partnership Project; Technical Specification Group Radio Access Network; Evolved Universal Terrestrial Radio Access (E-UTRA) and NR; Multi-connectivity; Stage 2 (Release 15), 2017, pp. 1-51.
3GPP TS 38.211, V15.0.0, 3rd Generation Partnership Project; Technical Specification Group Radio Access Network; NR; Physical channels and modulation (Release 15), 2017, pp. 1-73.
3GPP TS 38.213, V15.0.0, 3rd Generation Partnership Project; Technical Specification Group Radio Access Network; NR; Physical layer procedures for control (Release 15), 2017, pp. 1-56.
3GPP TS 38.214, V15.0.0, 3rd Generation Partnership Project; Technical Specification Group Radio Access Network; NR; Physical layer procedures for data (Release 15), 2017, pp. 1-71.
3GPP TS 38.300, V15.0.0, 3rd Generation Partnership Project; Technical Specification Group Radio Access Network; NR; NR and NG-RAN Overall Description; Stage 2 (Release 15), 2017, pp. 1-68.
3GPP TS 38.321, V15.0.0, 3rd Generation Partnership Project; Technical Specification Group Radio Access Network; NR; Medium Access Control (MAC) protocol specification (Release 15), 2017, pp. 1-55.
3GPP TS 38.212, V15.0.0, 3rd Generation Partnership Project; Technical Specification Group Radio Access Network; NR; Multiplexing and channel coding (Release 15), 2017, pp. 1-82.
NTT Docomo, Inc., "Work Item on New Radio (NR) Access Technology", 3GPP TSG RAN Meeting #78, RP-172834, Libson, Portugal, Dec. 18-21, 2017, 72 total pages.
AT&T et al., "WF on NR-LTE coexistence", 3GPP TSG RAN WG1 NR Ad-Hoc#2, R1-1711710, Qingdao, China, Jun. 27-30, 2017, 3 total pages.
Institute for Information Industry (III), "Uplink Pre-emption for URLLC Reliability", 3GPP TSG RAN WG1 Meeting #92bis, R1-1804450, Sanya, China, Apr. 16-20, 2018, pp. 1-4.
"5G Architecture Options—Full Set", Joint RAN/SA Meeting, RP-161266, Jun. 14, 2016, pp. 1-11.
AT&T et al., "WF on RAN3 signaling support for LTE-NR coexistence feature", 3GPP TSG RAN WG1 Meeting #90, R1-1714892, Prague, Czech Republic, Aug. 21-25, 2017, 5 total pages.
Panasonic, "Discussions on intended DL/UL direction configuration via Xn signaling", 3GPP TSG RAN WG1 Meeting #90bis, R1-1717777, Prague, Czech Republic, Oct. 9-13, 2017, pp. 1-2.
Partial Supplementary European Search Report issued Mar. 25, 2022 in European Patent Application No. 19841856.8, 19 pages.
European Patent Office, Extended European Search Report, Application No. 24187341.3, dated Sep. 24, 2024, in 12 pages.
Japanese Patent Office, Office Action, Application No. 2023-128942, dated Oct. 29, 2024, in 6 pages.
Japanese Patent Office, Notice of Reasons for Refusal, Application No. 2025-024702, dated Sep. 16, 2025, in 5 pages.
Intel Corporation, BWP switching delay, 3GPP TSG RAN WG4 #86 R4-1801795 , Feb. 19, 2018, in 4 pages.
Japanese Patent Office, Notice of Reasons for Refusal, Application No. 2025-024702, issued Mar. 3, 2026, in 5 pages.
ZTE, Remaining issue for BWP, 3GPP TSG RAN WG1 #93 R1-1806135, May 12, 2018, in 7 pages.

* cited by examiner

COMMUNICATION SYSTEM, BASE STATION AND USER EQUIPMENT INCLUDING TRANSMITTING INFORMATION ON FRAME TIMING OF THE BASE STATION

CROSS-REFERENCE TO RELATED APPLICATIONS

The present application is a continuation of U.S. application Ser. No. 17/056,313, filed Nov. 17, 2020, which is a 35 U.S.C. § 371 national stage of International Application No. PCT/JP2019/029054, filed Jul. 24, 2019, which claims the benefit of priority under 35 U.S.C. § 119 from Japanese Patent Application No. 2018-141113, filed Jul. 27, 2018, the entire contents of each of which are incorporated herein by reference.

TECHNICAL FIELD

The present invention relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARD) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MB SFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARD) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits “Nack” to the transmitter. The transmitter that has received “Nack” retransmits the data. If the receiver successfully decodes the received data, in other words, if a CRC error does not occur (CRC=OK), the receiver transmits “Ack” to the transmitter. The transmitter that has received “Ack” transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 v15.0.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 23).

Furthermore, several new technologies have been studied in 3GPP. The example studies include coexistence of the NR communication and the LTE communication (may be hereinafter referred to as NR-LTE coexistence) at the same frequency in the DC using an NR base station and a LTE base station, and reduction of the power consumption in the UE using bandwidth parts (BWPs) (see Non-Patent Documents 19 to 22).

In NR, the SRS to be used for sounding the uplink channel is allocated within the last 6 symbols in 1 slot consisting of 14 symbols. Furthermore, the number of symbols of the SRS is 1, 2, or 4 (see Non-Patent Documents 13 and 15).

PRIOR-ART DOCUMENTS

Non-Patent Documents

Non-Patent Document 1: 3GPP TS 36.300 V14.3.0
Non-Patent Document 2: 3GPP S1-083461
Non-Patent Document 3: 3GPP TR 36.814 V9.2.0
Non-Patent Document 4: 3GPP TR 36.912 V14.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.1.0
Non-Patent Document 9: 3GPP TR 38.804 V14.0.0
Non-Patent Document 10: 3GPP TR 38.912 V14.0.0
Non-Patent Document 11: 3 GPP RP-172115
Non-Patent Document 12: 3GPP TS 37.340 V15.0.0

Non-Patent Document 13: 3 GPP TS 38.211 V15.0.0
Non-Patent Document 14: 3GPP TS 38.213 V15.0.0
Non-Patent Document 15: 3GPP TS 38.214 V15.0.0
Non-Patent Document 16: 3GPP TS 38.300 V15.0.0
Non-Patent Document 17: 3GPP TS 38.321 V15.0.0
Non-Patent Document 18: 3GPP TS 38.212 V15.0.0
Non-Patent Document 19: 3GPP RP-172834
Non-Patent Document 20: 3GPP R1-1711710
Non-Patent Document 21: 3GPP R1-1714892
Non-Patent Document 22: 3GPP R1-1804450
Non-Patent Document 23: 3GPP RP-161266

SUMMARY

Problems to be Solved by the Invention

In the NR-LTE coexistence, the NR base station notifies the LTE base station of information on a slot scheduled by the NR base station. However, since a different numerology is supported in the NR system, the LTE base station cannot understand the timing of the slot scheduled by the NR base station. Thus, there is a possibility that the NR base station and the LTE base station in the NR-LTE coexistence perform scheduling for the same timing. This disables the UE to communicate with one of the base stations, which results in a problem of decrease in the reliability and the transmission rate in the communication between the UE and the base station.

Further in NR, the use of the BWP that uses a part of a band in the UL carrier has been studied to reduce the power consumption in the UE. However, the time necessary for switching between the BWPs when the UE switches between the BWPs and performs the uplink transmission is not taken into account. Thus, the base station does not appropriately preform the uplink scheduling near the time of switching between the BWPs. This causes problems of decrease in the reliability and the uplink transmission rate in the uplink communication in switching between the BWPs.

In view of the problems, one of the objects of the present invention is to provide a technology that can maintain the reliability and the transmission rate in the communication in NR.

Means to Solve the Problems

The present invention provides a communication system including: a communication terminal; and a first base station and a second base station that are configured to perform radio communication with the communication terminal, wherein the first base station notifies the second base station of information on a numerology to be used for communication between the first base station and the communication terminal when the first base station and the second base station provide the communication terminal with dual connectivity using a same frequency band.

The present invention also provides a base station configured to perform radio communication with a communication terminal, wherein the base station notifies another base station of information on a numerology to be used for communication between the base station and the communication terminal, when the base station provides the communication terminal with dual connectivity together with the other base station and the base station and the other base station use a same frequency band in the dual connectivity.

The present invention also provides a base station configured to perform radio communication with a communication terminal, wherein the base station receives, from another base station, information on a numerology to be used for communication between the other base station and the communication terminal, when the base station provides the communication terminal with dual connectivity together with the other base station and the base station and the other base station use a same frequency band in the dual connectivity.

The present invention also provides a communication system including: a base station; and a communication terminal configured to perform radio communication with the base station, wherein the communication terminal notifies the base station of information on a time necessary for switching between bandwidth parts (BWPs).

The present invention also provides a communication terminal configured to perform radio communication with a base station, wherein the communication terminal notifies the base station of information on a time necessary for the communication terminal to switch between bandwidth parts (BWPs).

The present invention also provides a base station configured to perform radio communication with a communication terminal, wherein the base station receives, from the communication terminal, information on a time necessary for the communication terminal to switch between bandwidth parts (BWPs).

Effects of the Invention

The present invention can avoid a collision between the base stations that provide dual connectivity (e.g., the LTE base station and the NR base station in the NR-LTE coexistence) in the scheduling for a communication terminal. As a result, the reliability and the communication rate in the communication can be maintained.

Alternatively, the present invention can prevent the inconsistency between the transmission timing of the communication terminal and the reception timing of the base station in the uplink transmission before and after switching between the BWPs. As a result, the reliability and the communication rate in the communication can be maintained.

The objects, features, aspects and advantages of the present invention will become more apparent from the following detailed description of the present invention when taken in conjunction with the accompanying drawings.

DESCRIPTION OF EMBODIMENTS

The First Embodiment

Figure 1:
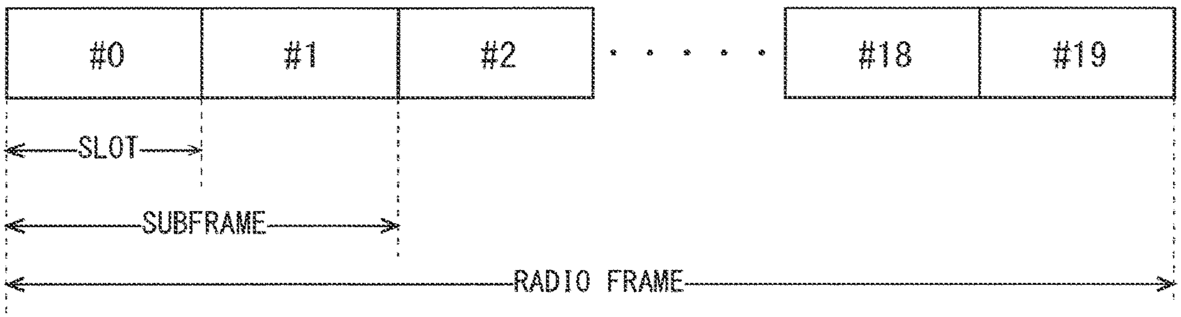
FIG. 1 is a diagram illustrating the configuration of a radio frame for use in an LTE communication system.
Figure 2:
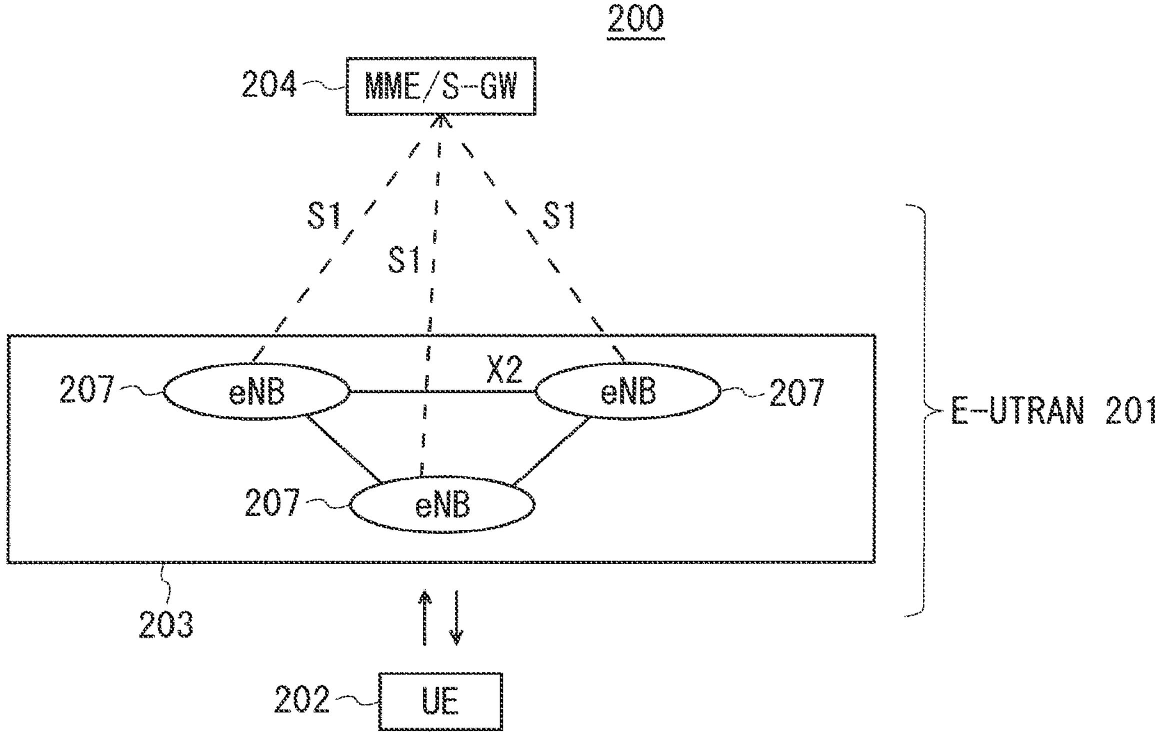
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

Figure 3:
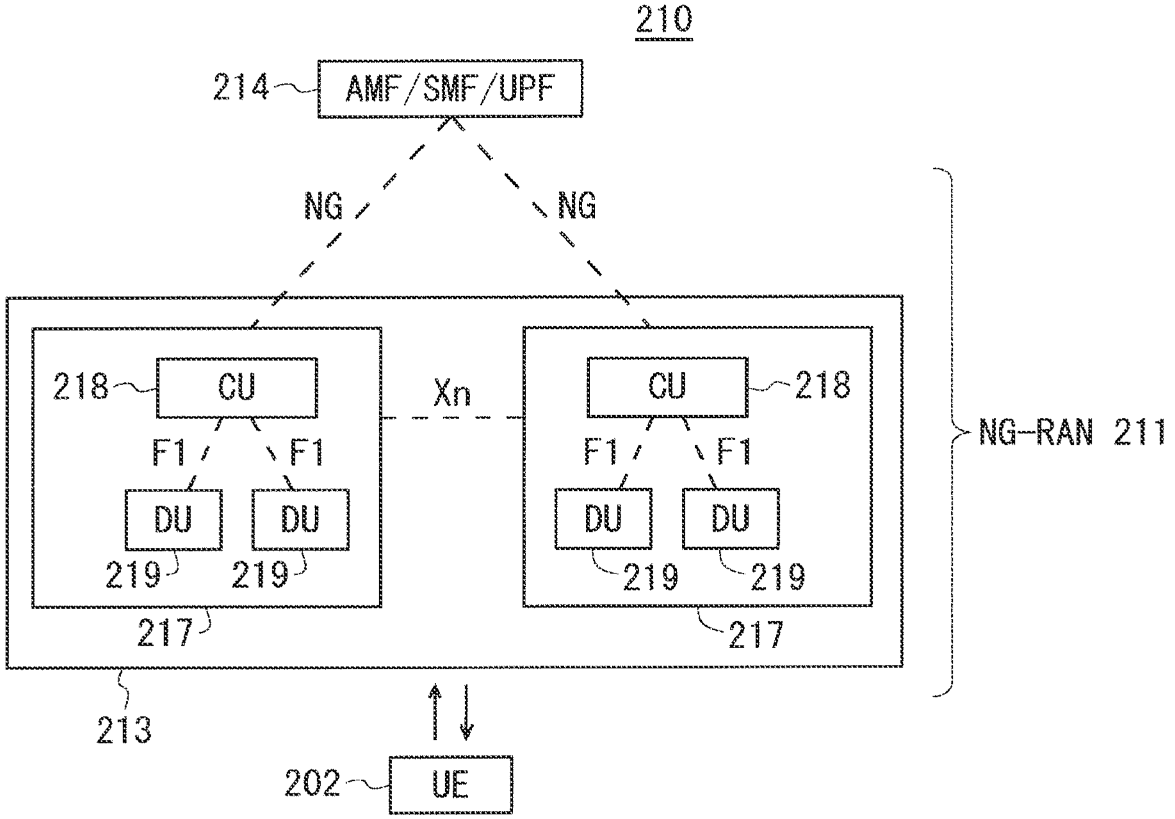
FIG. 3 is a block diagram illustrating an overall configuration of a NR communication system 210 that has been discussed in 3GPP.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 212, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 204 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 212.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

Figure 4:
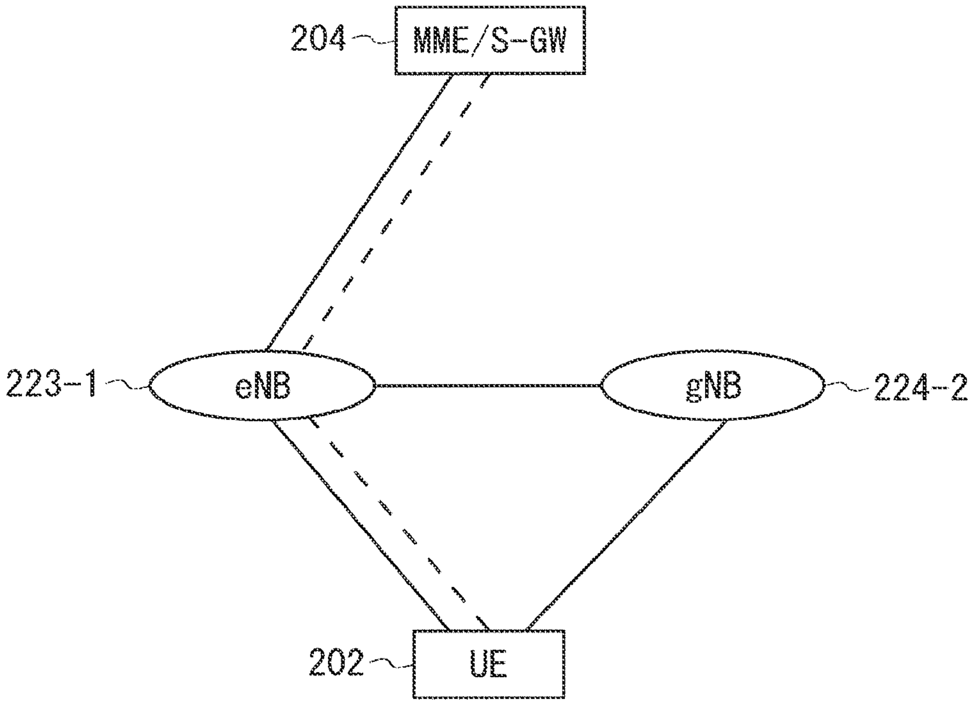
FIG. 4 illustrates a structure of the DC to be performed by an eNB and a gNB that are connected to the EPC.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 221 and the gNB 224-2.

Figure 5:
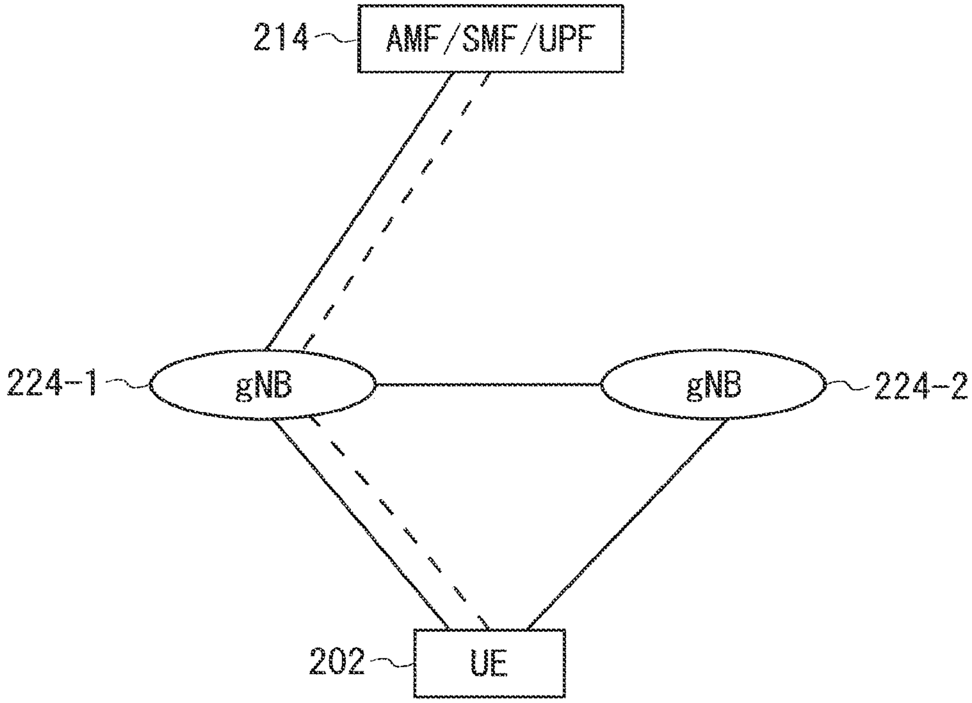
FIG. 5 illustrates a structure of the DC to be performed by gNBs that are connected to the NG core.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

Figure 6:
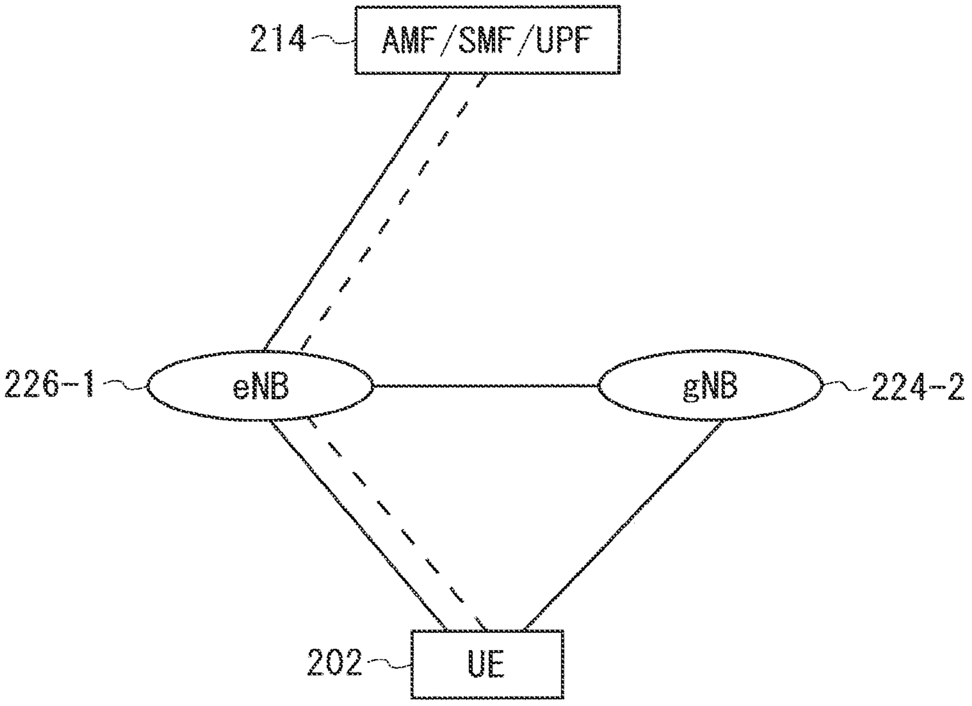
FIG. 6 illustrates a structure of the DC to be performed by the eNB and the gNB that are connected to the NG core.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

Figure 7:
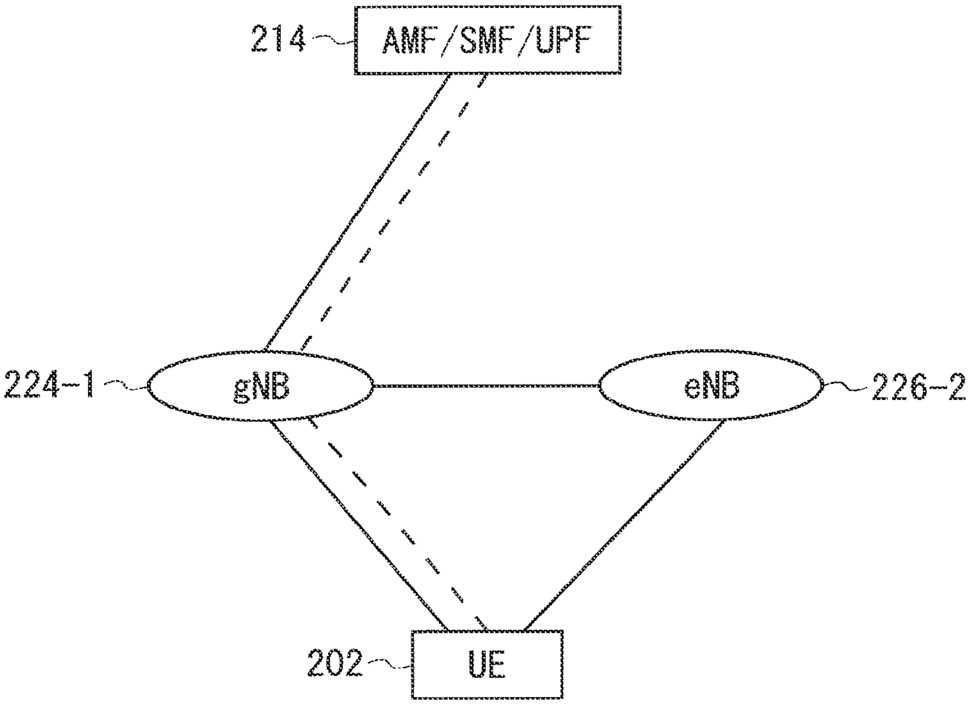
FIG. 7 illustrates a structure of the DC to be performed by the eNB and the gNB that are connected to the NG core.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
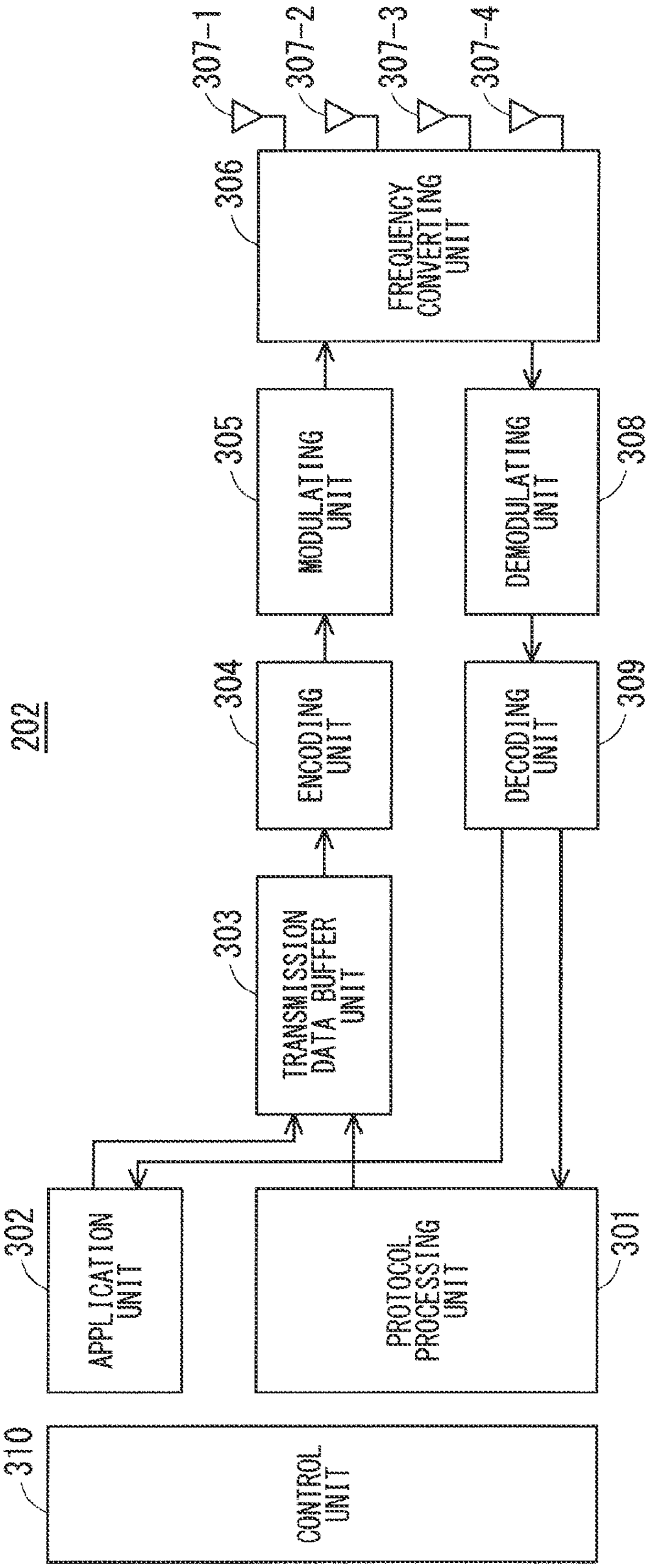
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
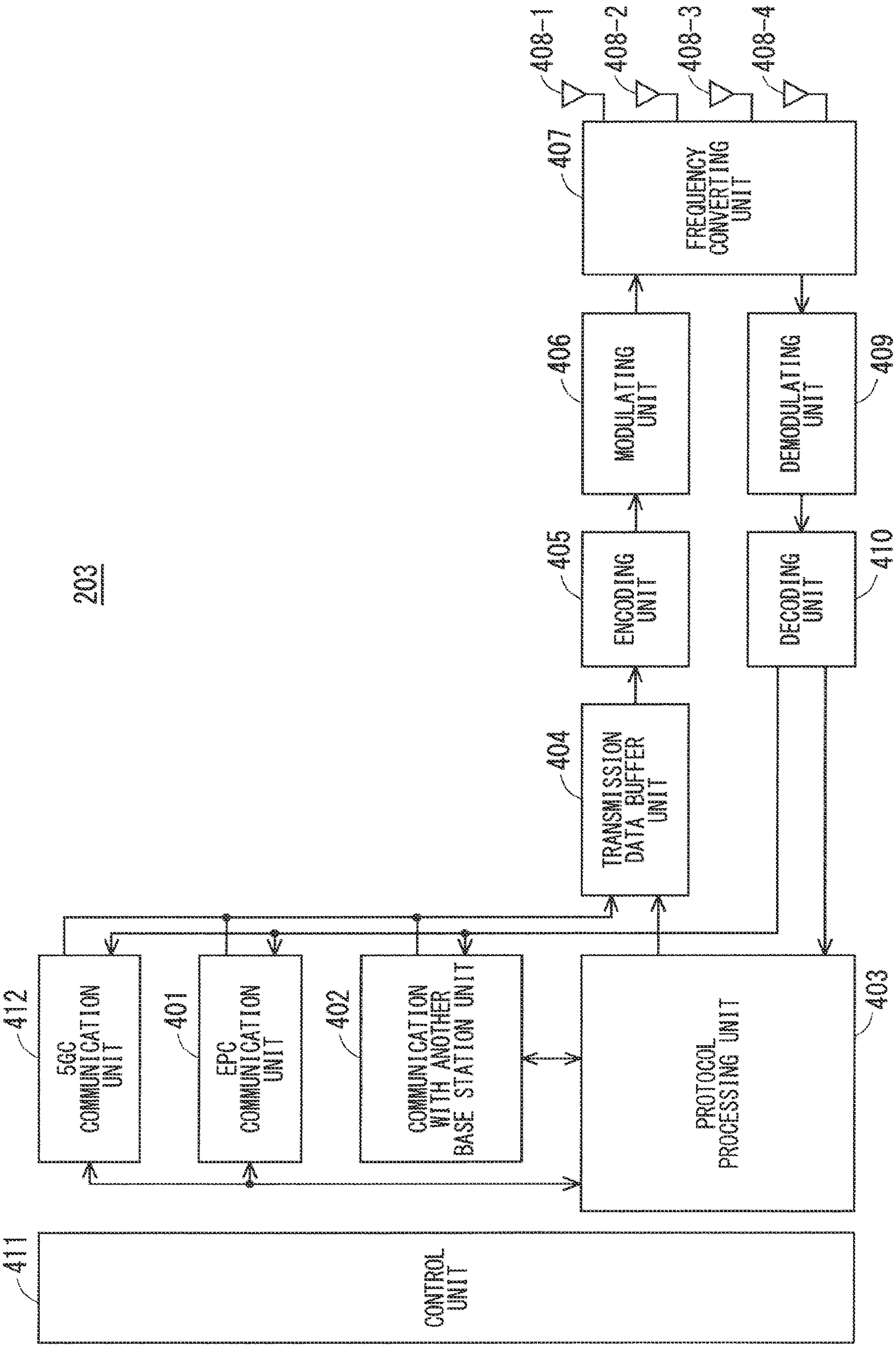
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204), HeNBGW 205, and the like. A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
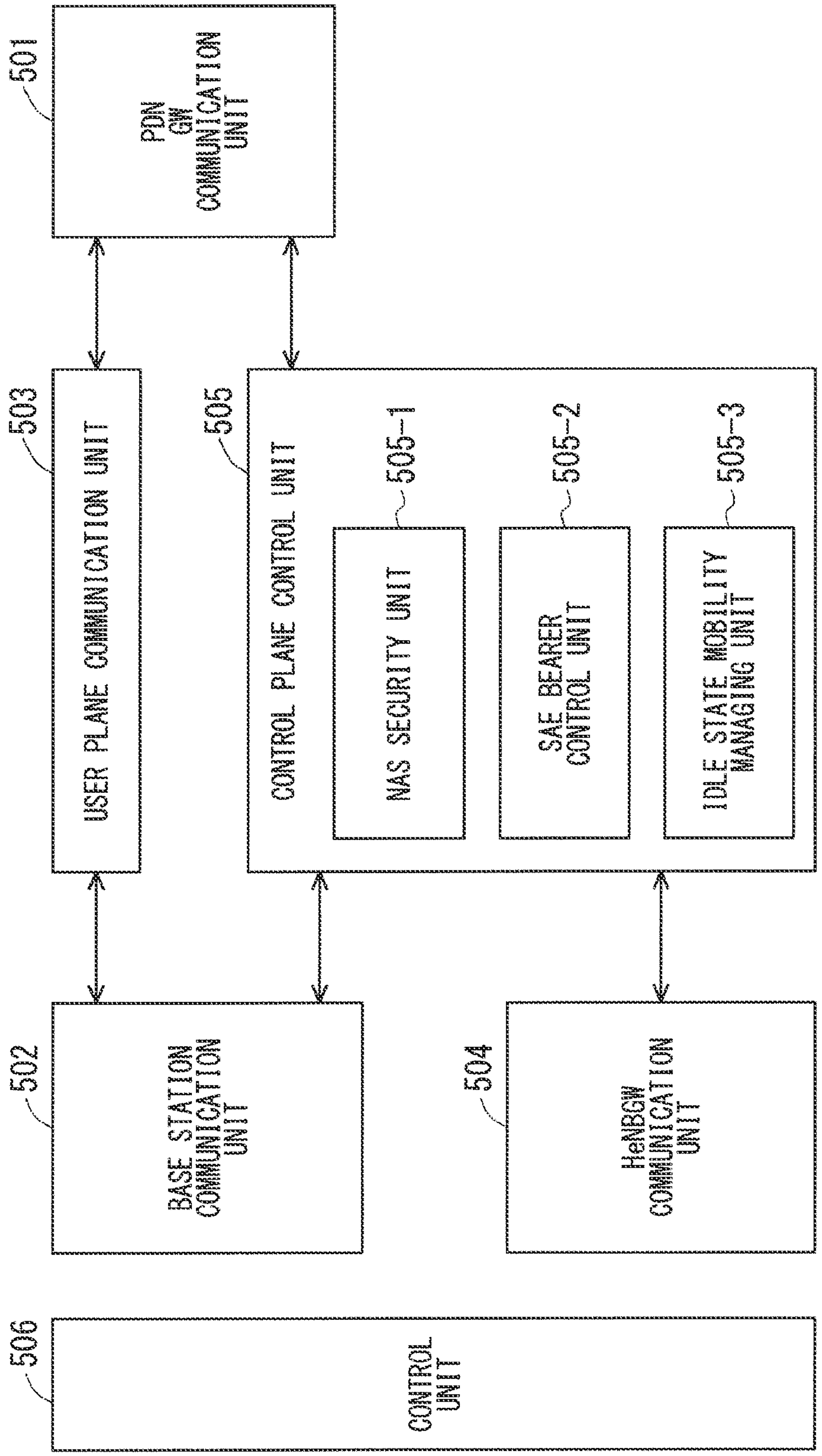
FIG. 10 is a block diagram showing the configuration of an MME.

FIG. 10 is a block diagram showing the configuration of the MME. FIG. 10 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204*a* and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and an active state, the MME 204*a* manages a list of tracking areas. The MME 204*a* begins a paging protocol by transmitting a paging message to the cell belonging to a tracking area in which the UE is registered. The idle state mobility managing unit 505-3 may manage the CSG of the Home-eNBs 206 to be connected to the MME 204*a*, CSG IDs, and a whitelist.

Figure 11:
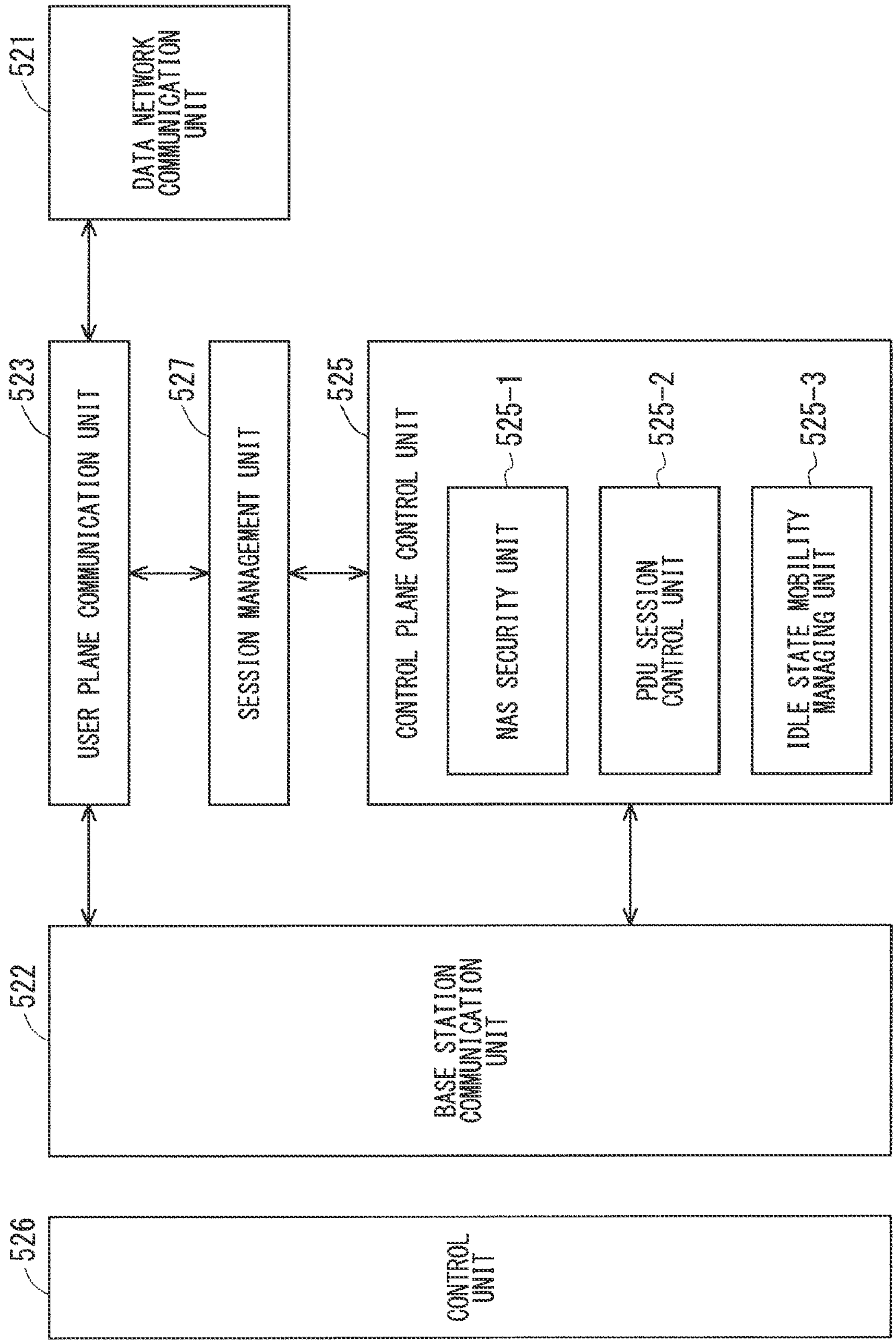
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility managing unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility managing unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
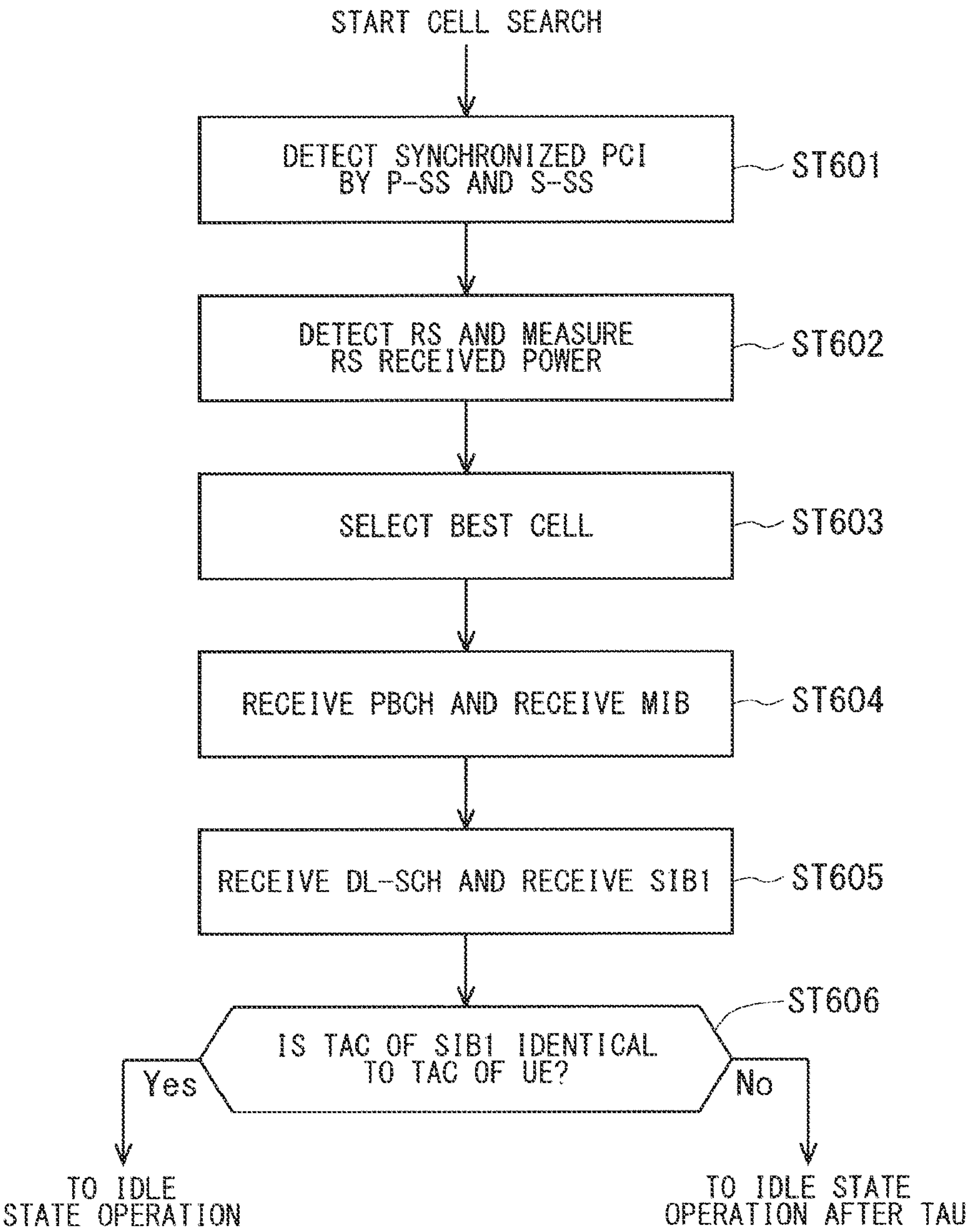
FIG. 12 is a flowchart showing an outline from a cell search to an idle state operation performed by a communication terminal (UE) in LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a “core-network-side device”) updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 13:
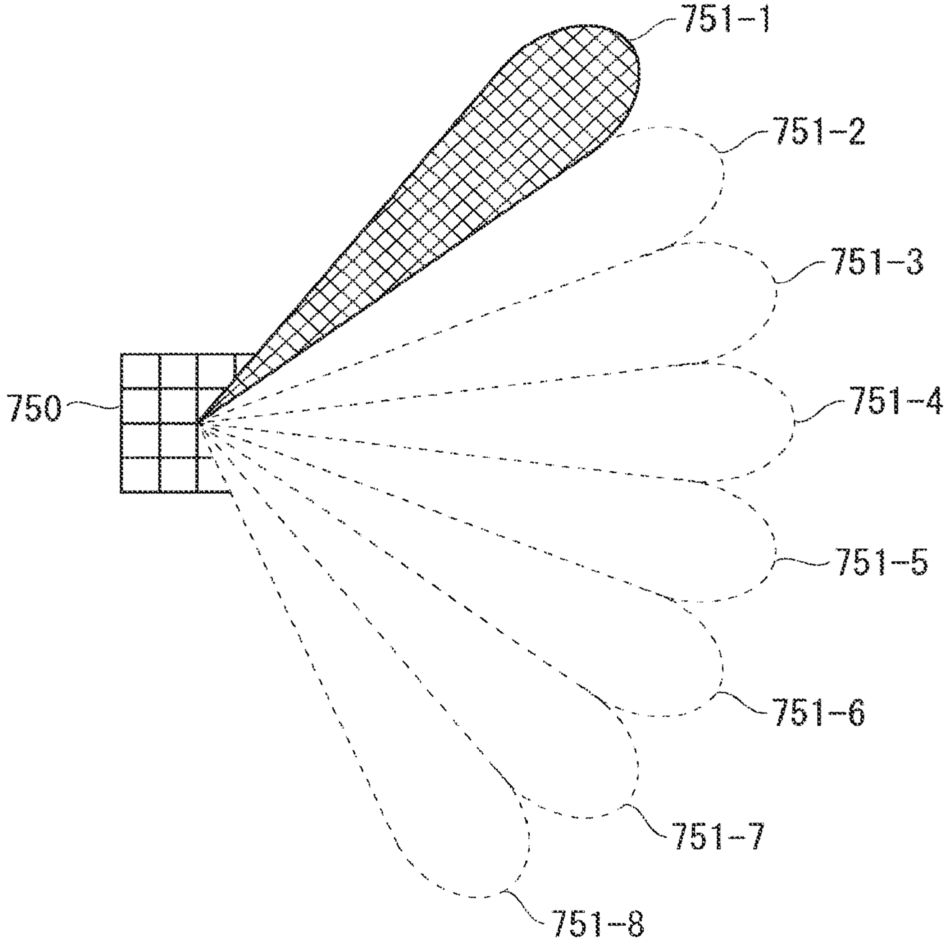
FIG. 13 illustrates an example structure of a cell in an NR system.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

As a scheduling method to be performed between an NR base station and an LTE base station in the NR-LTE coexistence, the NR base station allocates a slot in which transmission and reception are performed with the UE, and the LTE base station allocates, to a vacant slot after the allocation, a slot in which transmission and reception are performed with the UE.

The NR base station may notify the LTE base station of information on the slot allocated by its own base station. The NR base station may give the notification via the interface between the base stations. Furthermore, the NR base station may notify the LTE base station of information on the frame timing. The LTE base station may obtain, from the information, information on a difference in frame timing between the NR base station and the LTE base station. The LTE base station may perform scheduling for the UE, using the obtained information.

The structure of the DC may be the structure in FIG. 4, FIG. 6, or FIG. 7.

The following problem occurs in the method. In other words, since a different numerology is supported in the NR system, the LTE base station cannot understand the time resource scheduled by the NR base station. Thus, there is a possibility that the time resources scheduled by the NR base station and the LTE base station collide with each other in the NR-LTE coexistence. Thus, the UE cannot communicate with one of the base stations. This results in problems of decrease in the reliability and the transmission rate in the communication between the UE and the base station.

A method for solving the problems is disclosed. The NR base station notifies the LTE base station of information on the numerology to be used in the communication with the UE. The LTE base station obtains, from the information, information on the time resource scheduled by the NR base station.

The NR base station may include the information on the numerology in the information on the slot scheduled by its own NR base station for the UE to notify the information on the numerology. The information on the slot may include information on a scheduled symbol. This enables, for example, the LTE base station to obtain information on the time resource scheduled by the NR base station via one signaling. Thus, the LTE base station can perform a prompt scheduling process in the NR-LTE coexistence.

As another example, the NR base station may include the information on the numerology in the information on the frame timing of its own NR base station to notify the information on the numerology. The information on the frame timing may be, for example, information on a frame boundary, information on a frame number, or the information on a difference in frame timing between the NR base station and the LTE base station. The NR base station may receive a downlink signal of the LTE base station to measure the difference, or the UE may measure the difference and notify it to the NR base station. This can, for example, reduce the number of transmissions of the information on the numerology from the NR base station to the LTE base station. As a result, the amount of signaling via the interface between the base stations can be reduced.

As another example, the NR base station may notify the LTE base station of the information on the numerology without including the information on the numerology in the information on the slot scheduled by its own NR base station or in the information on the frame timing of its own NR base station. For example, the NR base station may notify the LTE base station of the information on the numerology via the signaling solely for notifying the information. The signaling may be newly provided. Alternatively, the NR base station may include the information on the numerology in another information to notify the information on the numerology. For example, the NR base station may include the information in the signaling for notifying the LTE base station of the RRC configuration change in the UE to notify the information. This can, for example, flexibly change the numerology to be used for transmission and reception between the NR base station and the UE, and reduce the amount of signaling from the NR base station to the LTE base station.

Figure 14:
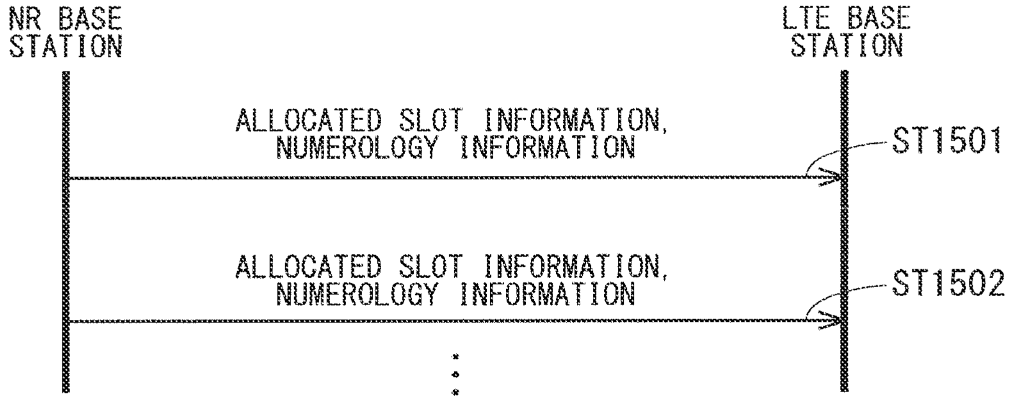
FIG. 14 illustrates operations when the NR base station notifies the LTE base station of information on the numerology to be used according to the first embodiment.

FIG. 14 illustrates operations when the NR base station notifies the LTE base station of information on the numerology to be used for communication with the UE. FIG. 14 illustrates a case where the NR base station includes the information on the numerology in information on a slot to be allocated by its own base station to notify the information on the numerology.

In Step ST1501 of FIG. 14, the NR base station includes the information on the numerology to be used for communication with the UE in information on a slot allocated to the UE by its own NR base station to notify the information on the numerology. In Step ST1502, the same operation as Step ST1501 is performed. Step ST1502 is performed when the information on the allocated slot in Step ST1501 is updated. Step ST1502 may be performed when the numerology to be used for communication with the UE is changed.

Figure 15:
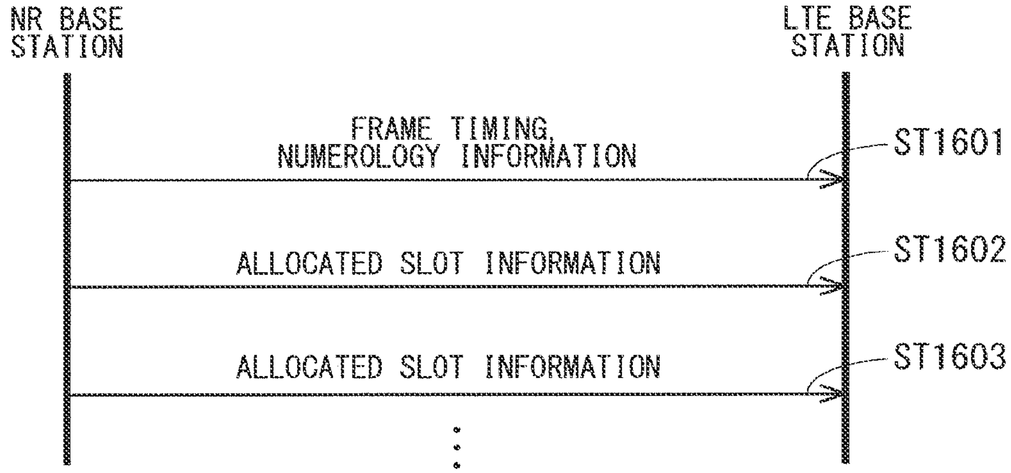
FIG. 15 illustrates another example of the operations when the NR base station notifies the LTE base station of information on the numerology to be used according to the first embodiment.

FIG. 15 illustrates another example of the operations when the NR base station notifies the LTE base station of information on the numerology to be used for communication with the UE. FIG. 15 illustrates a case where the NR base station includes the information on the numerology in information on the frame timing of its own base station to notify the information on the numerology.

In Step ST1601 of FIG. 15, the NR base station includes the information on the numerology to be used for communication with the UE in the information on the frame timing to be used by its own base station to notify the information on the numerology. In Step ST1602, the NR base station notifies the LTE base station of information on the slot allocated to the UE by its own NR base station. The LTE base station derives the time resource allocated by the NR base station, using the pieces of information in Steps ST1601 and ST1602. In Step ST1603, the NR base station performs the same operation as Step ST1602. The LTE base station derives the time resource allocated by the NR base station, using the pieces of information in Steps ST1601 and ST1603.

Although the NR base station notifies the LTE base station of information on the numerology according to the first embodiment, the UE may notify information on a BWP to be used in the communication with its own NR base station. The LTE base station may obtain, from the information on the BWP, the numerology to be used for transmission and reception between the NR base station and the UE. The NR base station should notify, in advance, the LTE base station of the BWP configured in the communication between the UE and its own NR, and the numerology to be used in the BWP. For example, the notification may be included in, for example, the signaling for notifying the LTE base station of the RRC configuration change in the UE. This can, for example, reduce the amount of signaling between the base stations.

The first embodiment enables the LTE base station to understand the information on the time resource scheduled by the NR base station in the NR-LTE coexistence. As a result, the reliability and the transmission rate can be maintained in the communication between the UE and both of the base stations.

The Second Embodiment

In switching between the BWPs in the UE, the base station includes information on a use BWP in an uplink scheduling grant to notify the UE of the information. The UE switches between the use BWPs in the uplink using the information to perform uplink transmission. The UE may be provided with a predetermined time, and switch between the use BWPs during the predetermined time. The predetermined time may be, for example, the time until the uplink transmission frequency in the UE is stabilized, or determined using another method.

Such a method causes the following problem. Specifically, the base station does not recognize the predetermined time in the UE. This causes inconsistency between the transmission timing of the UE and the reception timing of the base station in the communication between the UE and the base station before and after switching between the BWPs. This results in problems of decrease in the reliability and the communication rate in the communication.

A method for solving the problems is disclosed. The UE notifies the base station of information on the BWP switching time of its own UE. The information may be included in, for example, the UE capability. The UE may include the information in the UE capability to notify the base station of the information. The base station may obtain, from the notification, the BWP switching time in the UE. The base station may perform scheduling for the UE, using the BWP switching time. The BWP switching time may be determined using, for example, the time during which a radio frequency (RF) circuit of its own UE is stabilized.

The BWP switching time may be determined, for example, per microsecond, per predetermined time unit (e.g., Ts in LTE), or per symbol. The BWP switching time may be determined for each numerology. This facilitates, for example, the scheduling in the base station.

Figure 16:
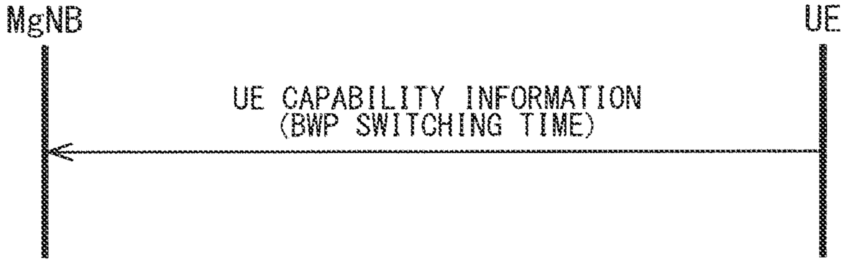
FIG. 16 illustrates an example operation when the UE notifies the base station of the BWP switching time according to the second embodiment.

One example thereof is described with reference to a diagram. FIG. 16 illustrates an example where the UE notifies the base station of information on the BWP switching time. In the example of FIG. 16, the UE includes the information in the UE capability to notify the base station of the information.

The following problem occurs when the method is applied. Specifically, the timing when the UE switches between the BWPs is not determined. This may cause, for example, a variance in the BWP to be used for transmission and reception between the base station and the UE when the time resources for the uplink transmission before and after switching between the BWPs are adjacent to each other. As a result, the base station cannot receive the uplink signal before and after switching between the BWPs. This causes problems of decrease in the reliability and the communication rate in the uplink communication before and after switching between the BWPs.

A method for solving the problems is disclosed. The UE stops the uplink transmission in a slot before switching between the BWPs earlier by the equivalent of the BWP switching time. The UE may stop the uplink transmission earlier by the equivalent of the BWP switching time or longer, for example, by the time obtained by rounding up the BWP switching time per symbol before switching between the BWPs. The UE may stop the uplink transmission via the signaling from the base station to the UE (e.g., the DCI). For example, the uplink transmission grant after switching between the BWPs may include information on the stop of the uplink transmission. The signaling may include the time during which the UE stops the uplink transmission, for example, information on the equivalent of the BWP switching time, or the timing at which the UE stops the uplink transmission, for example, information on the symbol number in which the UE stops the uplink transmission. As another example, the signaling may include a reason why the UE stops the uplink transmission, for example, information on switching between the BWPs. The UE may stop the uplink transmission earlier by the equivalent of the BWP switching time, using information on the reason. The uplink transmission stop time may be counted, for example, per symbol. The symbol may be, for example, a symbol in the BWP before switching.

As another example, the stop of the uplink transmission may be predefined as a standard on the operation of the UE. The UE may assume the unoccupied scheduling for the BWP switching time. In other words, the UE may autonomously stop the uplink transmission for the BWP switching time and switch between the BWPs without the signaling from the base station. This can, for example, reduce the amount of signaling from the base station to the UE.

Figure 17:
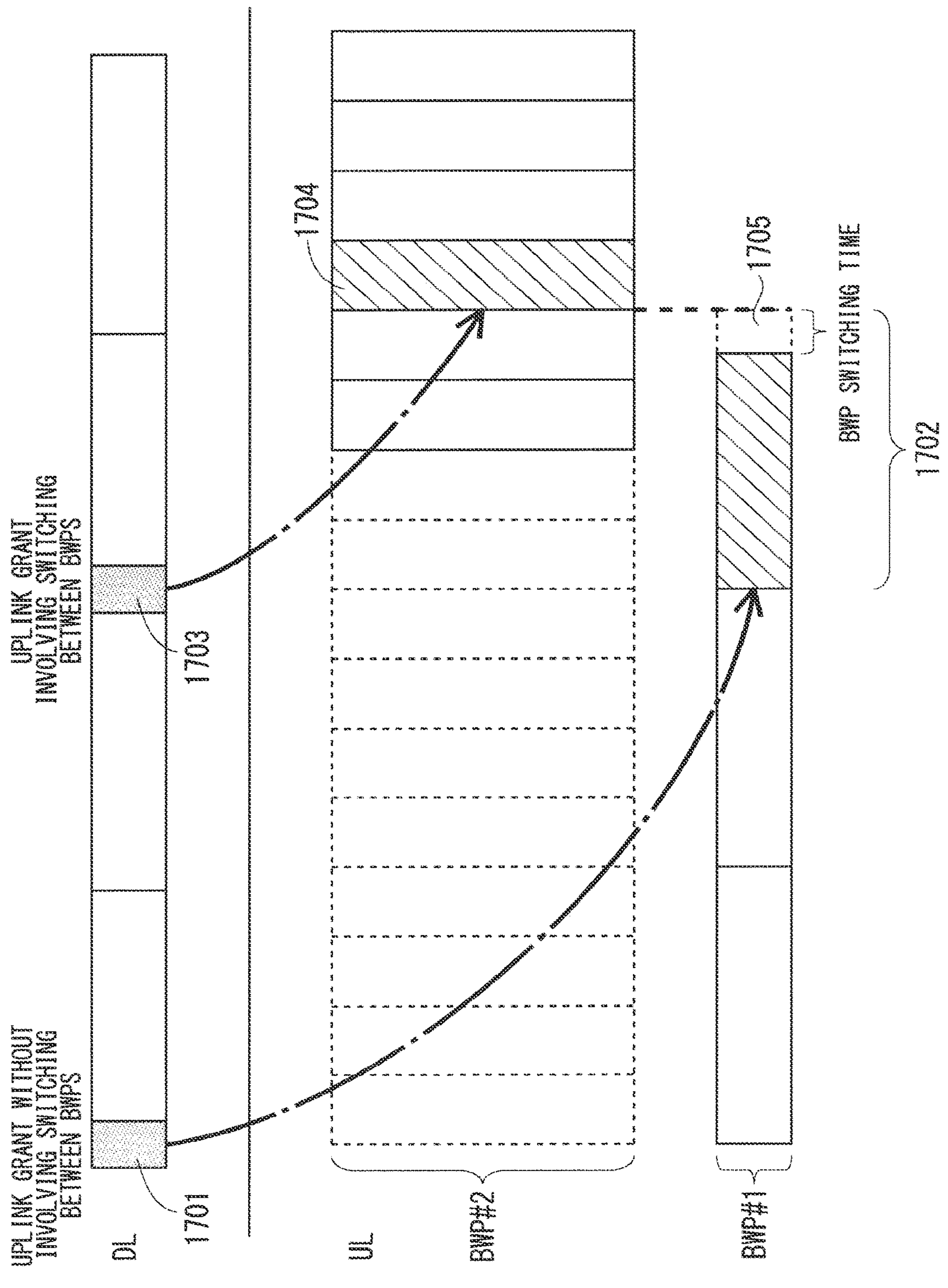
FIG. 17 illustrates an example of operations of stopping the uplink transmission before switching between the BWPs earlier by the equivalent of the BWP switching time according to the second embodiment.

FIG. 17 illustrates an example of operations when the UE stops the uplink transmission in a slot before switching between the BWPs earlier by the equivalent of the BWP switching time. In the example of FIG. 17, the BWP to be first used by the UE, that is, the use BWP at the left end of the diagram is a BWP #1.

In FIG. 17, the base station transmits an uplink grant 1701 to the UE. The uplink grant 1701 includes scheduling information for the uplink transmission using a slot 1702 in the BWP #1. Upon receipt of the uplink grant 1701, the UE performs the uplink transmission in the slot 1702 using the BWP #1.

In FIG. 17, the base station transmits an uplink grant 1703 to the UE. The uplink grant 1703 includes scheduling information for the uplink transmission using a slot 1704 in a BWP #2. Upon receipt of the uplink grant 1703, the UE stops the uplink transmission in a time resource 1705 corresponding to the BWP switching time in the slot 1702. The UE switches the use BWP from the BWP #1 to the BWP #2, and performs the uplink transmission in the slot 1704.

This solution may be applied to, for example, preemption. In the solution, for example, the uplink transmission using the BWP before switching may be uplink transmission to be preempted, that is, uplink transmission with a lower priority. The uplink transmission using the BWP after switching may be preempting uplink transmission, that is, uplink transmission with a higher priority. The priorities may be determined by, for example, the QCI allocated to a logical channel. This can, for example, maintain the reliability in the preemption.

Figure 18:
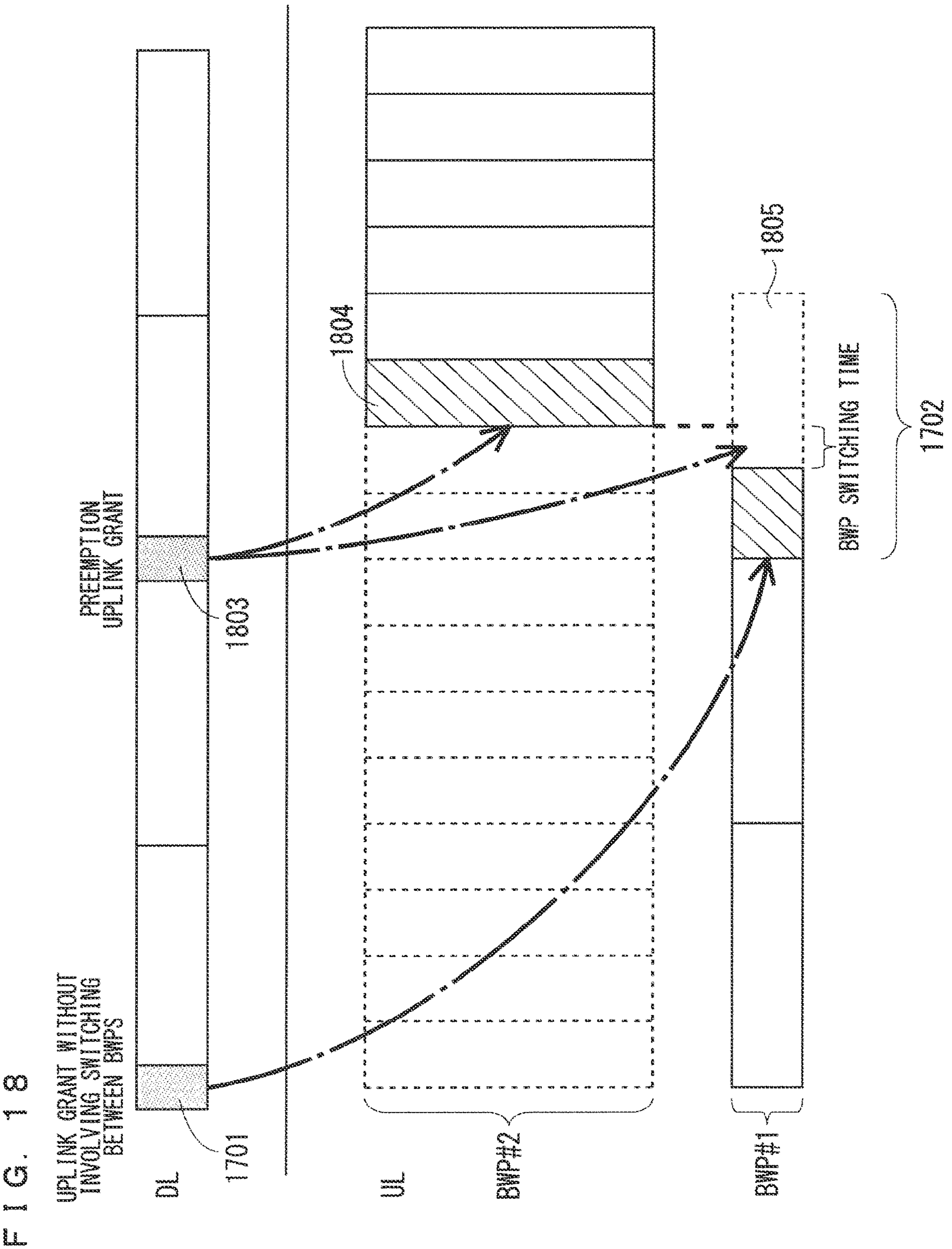
FIG. 18 illustrates an example of operations of stopping the uplink transmission before switching between the BWPs earlier by the equivalent of the BWP switching time in the preemption communication according to the second embodiment.

FIG. 18 illustrates an example of operations when the UE stops the uplink transmission in a slot before switching between the BWPs earlier by the equivalent of the BWP switching time in the preemption communication. In the example of FIG. 18, the base station transmits a preemption message to the UE in an uplink slot before switching between the BWPs. After aborting the transmission in the uplink slot to be preempted and switching between the BWPs, the UE performs the uplink transmission in the BWP newly allocated by the preemption message. In FIG. 18, the same figure numbers are applied to the elements common to those in FIG. 17, and the common description thereof is omitted.

The uplink grant 1701 and the slot 1702 in FIG. 18 are identical to those in FIG. 17.

In FIG. 18, the base station notifies the UE of a preemption grant 1803. The preemption grant 1803 includes scheduling information for the uplink preemption transmission using a slot 1804 in the BWP #2. The preemption grant 1803 may include preemption indication (PI) for the uplink transmission in the slot 1702. The UE may stop, using the preemption grant 1803, the uplink transmission in a time resource 1805 in the BWP #1. The time resource 1805 may include a time resource preceded from the slot 1804 by the BWP switching time. The UE switches, using the preemption grant 1803, the use BWP from the BWP #1 to the BWP #2, and performs the uplink preemption transmission in the slot 1704.

The solution may be applied when the numerologies before and after switching between the BWPs are the same. This produces the same advantages as previously described.

Figure 19:
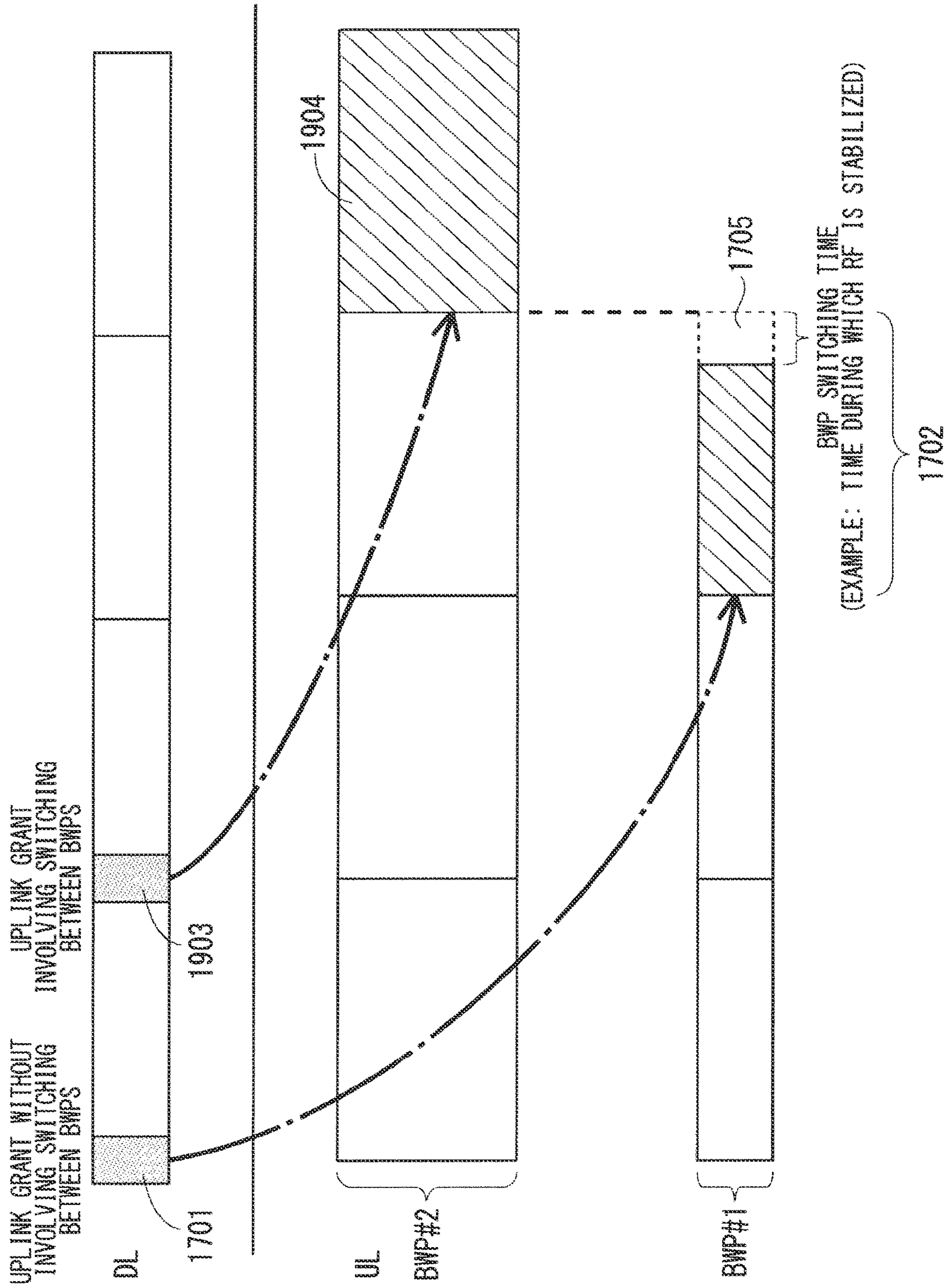
FIG. 19 illustrates an example of operations of stopping the uplink transmission before switching between the BWPs earlier by the equivalent of the BWP switching time when the numerologies before and after switching between the BWPs are the same according to the second embodiment.

FIG. 19 illustrates an example of stopping the uplink transmission in an uplink slot before switching between the BWPs earlier by the equivalent of the BWP switching time when the numerologies before and after switching between the BWPs are the same. In FIG. 19, the same figure numbers are applied to the elements common to those in FIG. 17, and the common description thereof is omitted.

The uplink grant 1701 and the slot 1702 in FIG. 19 are identical to those in FIG. 17.

In FIG. 19, the base station transmits an uplink grant 1903 to the UE. The uplink grant 1903 includes scheduling information for the uplink transmission using a slot 1904 in the BWP #2. Upon receipt of the uplink grant 1903, the UE stops the uplink transmission in a time resource 1705 corresponding to the BWP switching time in the slot 1702. The UE switches the use BWP from the BWP #1 to the BWP #2, and performs the uplink transmission in the slot 1904.

The BWP switching time in the solution may be at the timing earlier than the scheduling start timing after switching between the BWPs or the timing earlier than the scheduling end timing before switching between the BWPs. For example, when the scheduling after switching between the BWPs starts from a symbol in the middle of a slot, the BWP switching time may precede the symbol. This enables, for example, application of the solution to the switching between the BWPs in the non-slot scheduling. The non-slot scheduling may be, for example, non-slot scheduling in the preemption. This can, for example, maintain the reliability in the preemption using the non-slot scheduling.

Another solution is disclosed. The UE may stop the uplink transmission in a slot after switching between the BWPs until the time later by the equivalent of the BWP switching time. The UE may stop the uplink transmission until the time later by the equivalent of the BWP switching time or longer, for example, until the time later by the time obtained by rounding up the BWP switching time per symbol before switching between the BWPs. The UE may stop the uplink transmission via the signaling from the base station to the UE (e.g., the DCI). For example, the uplink transmission grant after switching between the BWPs may include information on the stop of the uplink transmission. The signaling may include the time during which the UE stops the uplink transmission, for example, information on the equivalent of the BWP switching time, or the timing at which the UE stops the uplink transmission, for example, information on the symbol number in which the UE stops the uplink transmission. As another example, the signaling may include a reason why the UE stops the uplink transmission, for example, information on switching between the BWPs. The UE may start the uplink transmission later by the equivalent of the BWP switching time, using information on the reason. The uplink transmission stop time may be counted, for example, per symbol. The symbol may be, for example, a symbol in the BWP after switching.

As another example, the stop of the uplink transmission may be predefined as a standard on the operation of the UE. The UE may assume the unoccupied scheduling for the BWP switching time. In other words, the UE may autonomously switch between the BWPs at the BWP switching time and start the uplink transmission without the signaling from the base station. This can, for example, reduce the amount of signaling from the base station to the UE.

The numerologies before and after switching between the BWPs may be the same or different. This produces the same advantages as previously described.

Figure 20:
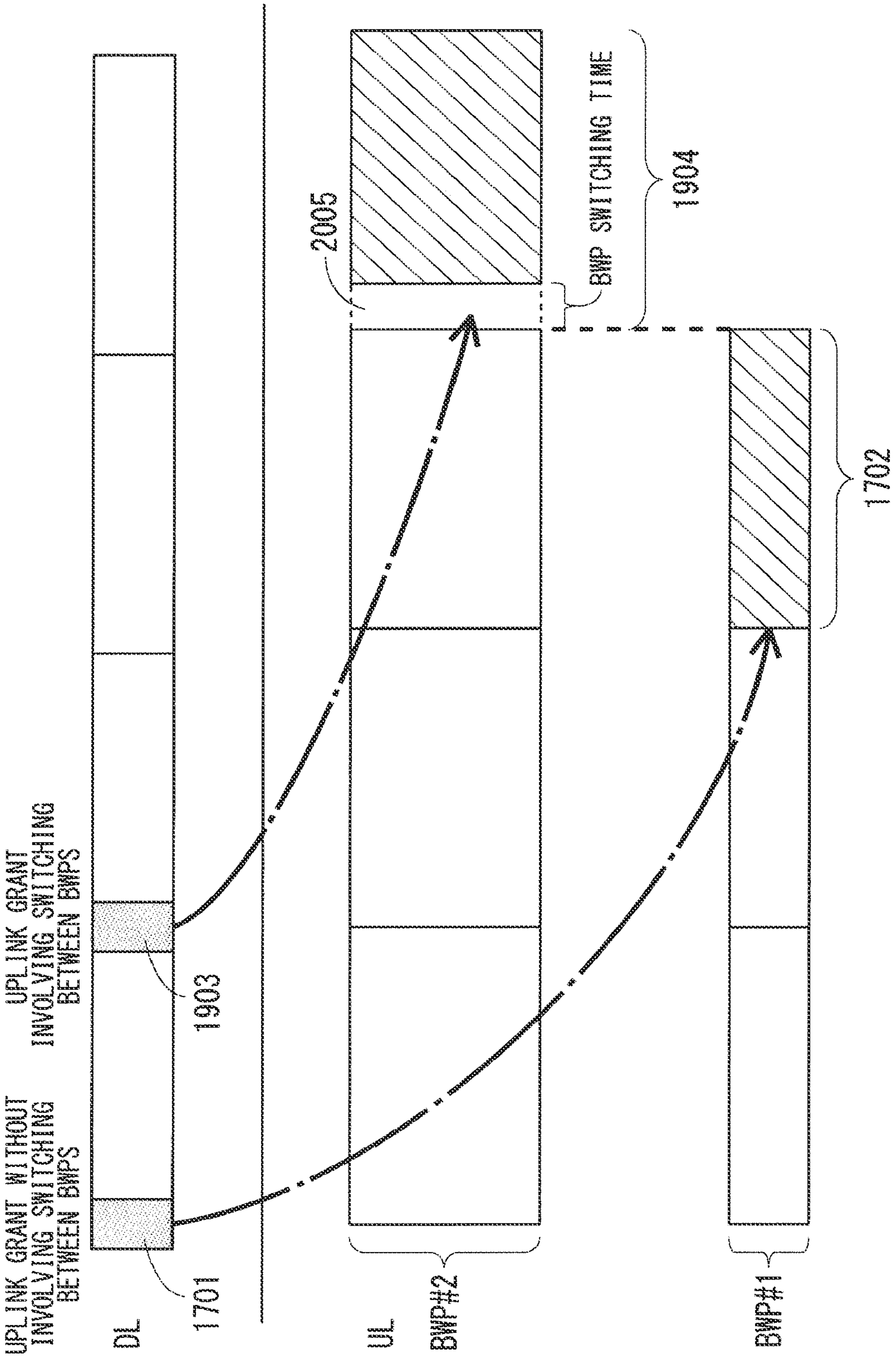
FIG. 20 illustrates an example of operations of starting the uplink transmission after switching between the BWPs later by the equivalent of the BWP switching time according to the second embodiment.

FIG. 20 illustrates an example of starting the uplink transmission in an uplink slot after switching between the BWPs later by the equivalent of the BWP switching time. FIG. 20 illustrates a case where the numerologies before and after switching between the BWPs are the same. In FIG. 20, the same figure numbers are applied to the elements common to those in FIG. 17, and the common description thereof is omitted.

The uplink grant 1701 and the slot 1702 in FIG. 20 are identical to those in FIG. 17.

In FIG. 20, the base station transmits the uplink grant 1903 to the UE. The uplink grant 1903 includes scheduling information for the uplink transmission using the slot 1904 in the BWP #2. Upon receipt of the uplink grant 1903, the UE switches the use BWP from the BWP #1 to the BWP #2 after the uplink transmission in the slot 1702. The UE performs the uplink transmission in the slot 1904 after a lapse of the time resource 1705 corresponding to the BWP switching time.

Although FIG. 20 illustrates the case where the numerologies before and after switching between the BWPs are the same, the numerologies may be different. This produces the same advantages as previously described.

The BWP switching time may be at the timing after the scheduling start timing after switching between the BWPs or the timing after the scheduling end timing before switching between the BWPs. For example, when the scheduling after switching between the BWPs starts from a symbol in the middle of a slot, the BWP switching time may follow the symbol. This enables, for example, application of the solution to the switching between the BWPs in the non-slot scheduling.

Another solution is disclosed. The BWP switching time may be divided into slots before and after switching between the BWPs. The BWP switching time may be evenly divided into the slots before and after switching between the BWPs. As another example, the BWP switching time may be unevenly divided into the slots before and after switching between the BWPs. For example, the division may be determined using the slot lengths. As an example where the division is determined using the slot lengths, when a ratio of the slot lengths before and after switching between the BWPs is 4:1, the BWP switching time before and after switching between the BWPs may be divided in the ratio of 4:1. This can be similarly applied to, for example, a proportion of the uplink transmission stop times before and after switching between the BWPs, in the scheduled time resource. As a result, the base station can maintain the reliability in decoding, using the error correction, etc., the pieces of uplink data before and after switching between the BWPs. As another example, the amount of data whose transmission is to be aborted may be evenly divided. The divided uplink transmission stop times may be given or rounded up per symbol length before and after switching between the BWPs.

The base station may determine the division. The base station may notify the UE of information on the division. The base station may give the notification, for example, via the RRC signaling or the MAC signaling, or using the DCI. The UE may stop the uplink transmission during the divided BWP switching times. The UE may stop the uplink transmission via the signaling from the base station to the UE (e.g., the DCI). For example, the uplink transmission grant after switching between the BWPs may include information on the stop of the uplink transmission. The base station may give each of the uplink transmission stop times before and after switching between the BWPs as a time per symbol before and after switching between the BWPs.

As another example, the division may be predefined as a standard. The division may be, for example, even division before and after switching between the BWPs, or determined using the slot lengths or another information. The UE may assume, using the division, the unoccupied scheduling before and after switching between the BWPs. In other words, the UE may autonomously switch between the BWPs at the BWP switching time and start the uplink transmission, without the signaling from the base station. This can, for example, reduce the amount of signaling from the base station to the UE.

Figure 21:
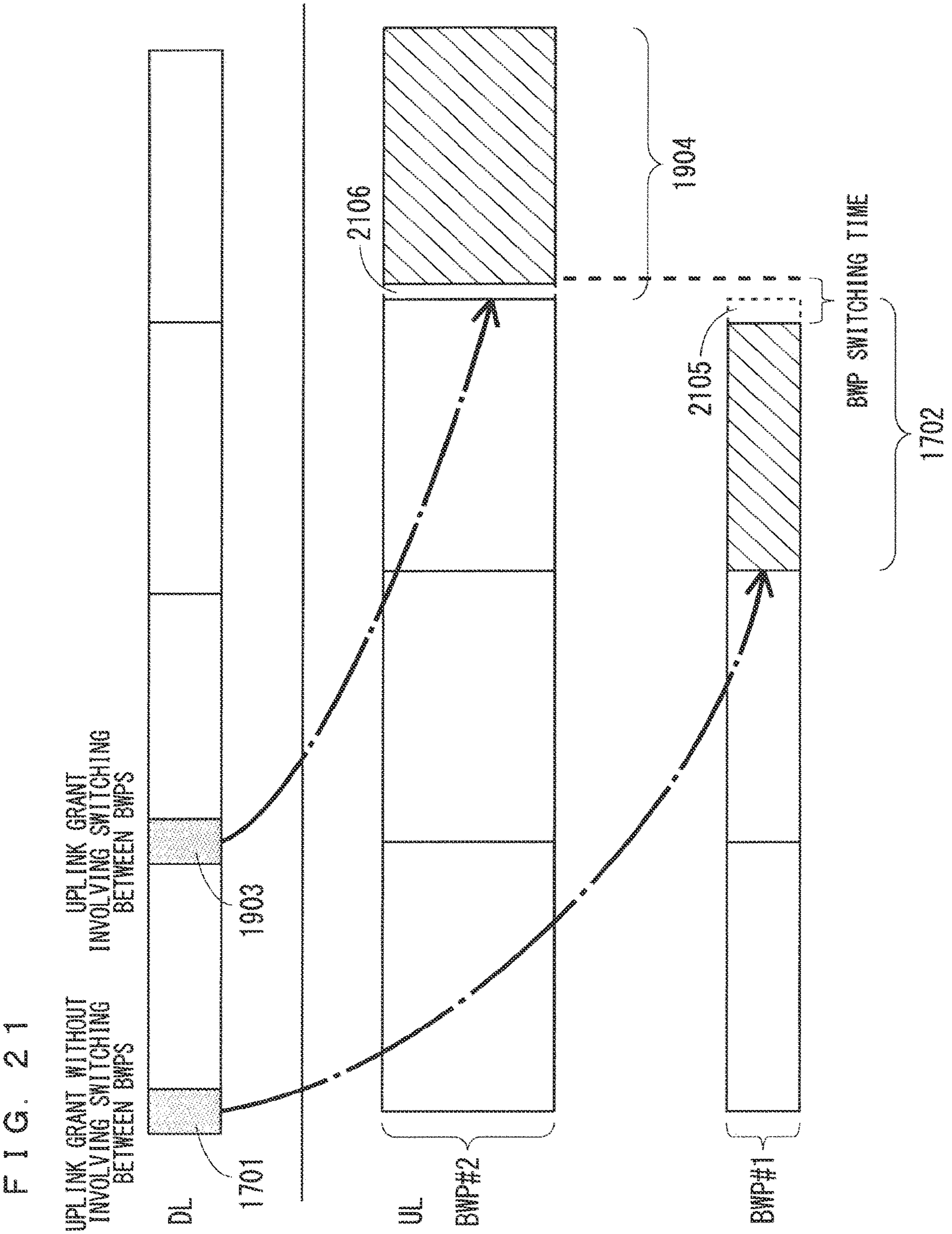
FIG. 21 illustrates an example of operations of dividing the transmission abort time which is equivalent of the BWP switching time after an uplink slot before switching between the BWPs and before an uplink slot after switching between the BWPs according to the second embodiment.

FIG. 21 illustrates an example of dividing the transmission abort time which is equivalent of the BWP switching time in a latter end of an uplink slot before switching between the BWPs and in a front end of an uplink slot after switching between the BWPs. FIG. 21 illustrates an example where the BWP switching time before and after switching between the BWPs is evenly divided. In FIG. 21, the same figure numbers are applied to the elements common to those in FIG. 17, and the common description thereof is omitted.

The uplink grant 1701 and the slot 1702 in FIG. 21 are identical to those in FIG. 17.

In FIG. 21, the base station transmits the uplink grant 1903 to the UE. The uplink grant 1903 includes scheduling information for the uplink transmission using the slot 1904 in the BWP #2. Upon receipt of the uplink grant 1903, the UE stops the uplink transmission in a time resource 2105 corresponding to the time divided for the slot before switching between the BWPs in the BWP switching time in the slot 1702. The UE switches the use BWP from the BWP #1 to the BWP #2 The UE performs the uplink transmission in the slot 1904 after a lapse of a time resource 2106 corresponding to the time divided for the slot after switching between the BWPs in the BWP switching time.

Although FIG. 21 illustrates a case where the time resources 2105 and 2106 are even, the time resources 2105 and 2106 may be different from each other. Although FIG. 21 illustrates the case where the numerologies before and after switching between the BWPs are the same, the numerologies may be different. This produces the same advantages as previously described.

The BWP switching time may be divided before and after the scheduling start timing after switching between the BWPs, or before and after the scheduling end timing before switching between the BWPs. For example, when the scheduling after switching between the BWPs starts from a symbol in the middle of a slot, the BWP switching time may follow the symbol. This enables, for example, application of the solution to the switching between the BWPs in the non-slot scheduling.

Another solution is disclosed. The BWP switching time in the UE may be predefined in a standard. The UE may switch between the BWPs within the time defined in a standard. The base station may perform scheduling for the UE, using the time defined in a standard. The BWP switching time may be determined by, for example, a frequency band before switching, a frequency band after switching, or a combination of the frequency bands before and after switching. Since, for example, the UE need not notify the base station of information on the BWP switching time, the amount of signaling between the UE and the base station can be reduced.

Which solution in the second embodiment is used may be predetermined in a standard, or determined and notified to the UE by the base station. For example, the BWP switching time may be allocated, in the preemption communication, within the time resource scheduled for the uplink transmission to be preempted, or allocated within the time resource scheduled after switching between the BWPs in the other cases. This can, for example, maintain the reliability in the communication requiring the high reliability such as the URLLC.

According to the second embodiment, the UE may stop the uplink transmission by not transmitting data mapped to the symbols during the stop duration or by remapping the data to symbols except the duration (i.e., coding and modulation are performed again). The UE may stop the uplink transmission with a combination of the two. The UE may stop the uplink transmission, for example, before switching between the BWPs by not transmitting the data mapped to the symbols during the stop duration. The UE may stop the uplink transmission, for example, after switching between the BWPs by remapping the data to the symbols except the duration. This can, for example, maintain the reliability in the uplink transmission in UE, and reduce an increase in the amount of processing in the UE.

The methods disclosed in the second embodiment may be applied to switching between the SUL and the non-SUL. The methods may be applied by replacing the switching between the BWPs in the second embodiment with the switching between the SUL and the non-SUL. As another example, the methods disclosed in the second embodiment may be applied to both of the switching between the BWPs and the switching between the SUL and the non-SUL. The BWP switching time and the SUL/non-SUL switching time may be common or different. For example, making the BWP switching time and the SUL/non-SUL switching time common enables reduction in the size of the UE capability.

The second embodiment can prevent unnecessary transmission and reception in the switching between the BWPs. This produces an advantage of preventing decrease in the reliability and the transmission rate in the communication.

The embodiments and the modifications are mere exemplifications of the present invention, and can be freely combined within the scope of the present invention. The arbitrary constituent elements of the embodiments and the modifications can be appropriately modified or omitted.

For example, a slot in the embodiments and the modifications is an example time unit of communication in the fifth generation base station communication system. The slot may be configured per scheduling. The processes described in the embodiments and the modifications as being performed per slot may be performed per TTI, per subframe, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES

200 communication system, 202 communication terminal device, 203 base station device.

The invention claimed is:

1. A communication system, comprising:

a user equipment, a first base station being a master base station, and a second base station being a secondary base station, the first base station and the second base station being configured to:

perform radio communication with the user equipment, and provide the user equipment with dual connectivity, wherein the first base station is configured to notify the second base station of a difference of frame timings of the first base station and the second base station as information on a frame timing of the first base station, the difference being measured by the user equipment, wherein the first base station is configured to further notify the second base station of information on numerology used for communication with the user equipment, and wherein the first base station is configured to include the information on the frame timing and the information on numerology used for communication with the user equipment in a single signaling message to notify the second base station.

2. The communication system according to claim 1, wherein an inter-base station interface is used for the notification of the frame timing of the first base station.

3. The communication system according to claim 1, wherein the first base station is configured to notify the second base station of information on a slot allocated to the user equipment.

4. The communication system according to claim 3, wherein the first base station is an NR base station (gNB), the second base station is an LTE base station (eNB), and an inter-base station interface is used for the notification of the information on the slot.

5. The communication system according to claim 1, wherein the first base station is configured to notify the second base station of information on a symbol.

6. A base station being a master base station, the base station configured to:

perform radiocommunication with a user equipment, and provide the user equipment with dual connectivity together with an other base station being a secondary base station, wherein the base station is configured to notify the other base station of a difference of frame timings of the base station and the other base station as information on a frame timing of the base station, the difference being measured by the user equipment, wherein the base station is configured to further notify the other base station of information on numerology used for communication with the user equipment, and wherein the base station is configured to include the information on the frame timing and the information on numerology used for communication with the user equipment in a single signaling message to notify the other base station.

7. A user equipment configured to:

perform radio communication with a first base station being a master base station and a second base station being a secondary base station;

measure a difference of frame timings of the first base station and the second base station; and notify the first base station of the difference as information on a frame timing of the first base station, wherein the first base station is configured to provide the user equipment with dual connectivity together with the second base station, and wherein the first base station is configured to notify the second base station of the information on the frame timing of the first base station, wherein the first base station is configured to further notify the second base station of information on numerology used for communication with the user equipment, and wherein the first base station is configured to include the information on the frame timing and the information on numerology used for communication with the user equipment in a single signaling message to notify the second base station.

* * * * *